United States Patent [19]
Oishi et al.

[11] Patent Number: 5,511,054
[45] Date of Patent: Apr. 23, 1996

[54] APPARATUS AND METHOD FOR MULTIPLEXING ENCODED DATA SIGNALS AND RECORDING MEDIUM HAVING MULTIPLEXED SIGNALS RECORDED THEREON

[75] Inventors: Noriaki Oishi, Kanagawa; Markus H. Veltman, Tokyo, both of Japan

[73] Assignee: Sony Corporation, Tokyo, Japan

[21] Appl. No.: 219,476

[22] Filed: Mar. 29, 1994

[30] Foreign Application Priority Data

Mar. 31, 1993 [JP] Japan .................................. 5-073400

[51] Int. Cl.$^6$ ...................................................... G11B 7/00
[52] U.S. Cl. ............................... 369/59; 369/48; 369/49; 369/60; 360/19.1; 360/20; 360/29; 360/39
[58] Field of Search .................... 369/59, 60, 47, 369/48, 54, 58, 49, 50, 124; 360/75, 19.1, 20, 23, 29, 33.1, 39

[56] References Cited

U.S. PATENT DOCUMENTS 4,918,523  4/1990  Simon et al. .................. 369/59 X

FOREIGN PATENT DOCUMENTS

| | | |
|---|---|---|
| 0271866 | 6/1988 | European Pat. Off. . |
| 0503560 | 9/1992 | European Pat. Off. . |
| 0515101 | 11/1992 | European Pat. Off. . |
| 2497041 | 6/1982 | France . |
| 2259229 | 3/1993 | United Kingdom . |

OTHER PUBLICATIONS

Signal Processing Image Communication, vol. 4, No. 2, Apr. 1992, Amsterdam NL pp. 153–159 A.
Electronics & Communications in Japan, Part I—Communications, vol. 75, No. 7, Jul. 1992, New York US pp.22–32 Y. Kajiyama et al. 'A multiplexing method of multimedia signal in ATM networks'.

*Primary Examiner*—Georgia Y. Epps
*Assistant Examiner*—Muhammad N. Edun
*Attorney, Agent, or Firm*—William S. Frommer; Alvin Sinderbrand

[57] ABSTRACT

A multiplexed data stream is formed by encoding a first input signal at a variable bit rate to form a first encoded data signal which is temporarily stored in a first storage device, encoding a second input signal at a constant bit rate to form a second encoded data signal which is temporarily stored in a second storage device, and using a multiplexing circuit to multiplex the first and second encoded data signals respectively stored in the first and second storage devices to form the desired multiplexed data stream. Transfer of the first encoded data signal from the first storage device to the multiplexing circuit is controlled on the basis of a quantity of the first encoded data signal that is present in the first storage device. When none of the first encoded data signal is present in the first storage device, transfer of the first encoded data signal to the multiplexing circuit is temporarily halted. A switching device is switched at fixed time intervals, on the basis of a quantity of the second encoded data signal that is present in the second storage device, between a first switch position at which the multiplexing circuit is connected to the first storage device and a second switch position at which the multiplexing circuit is connected to the second storage device.

20 Claims, 6 Drawing Sheets

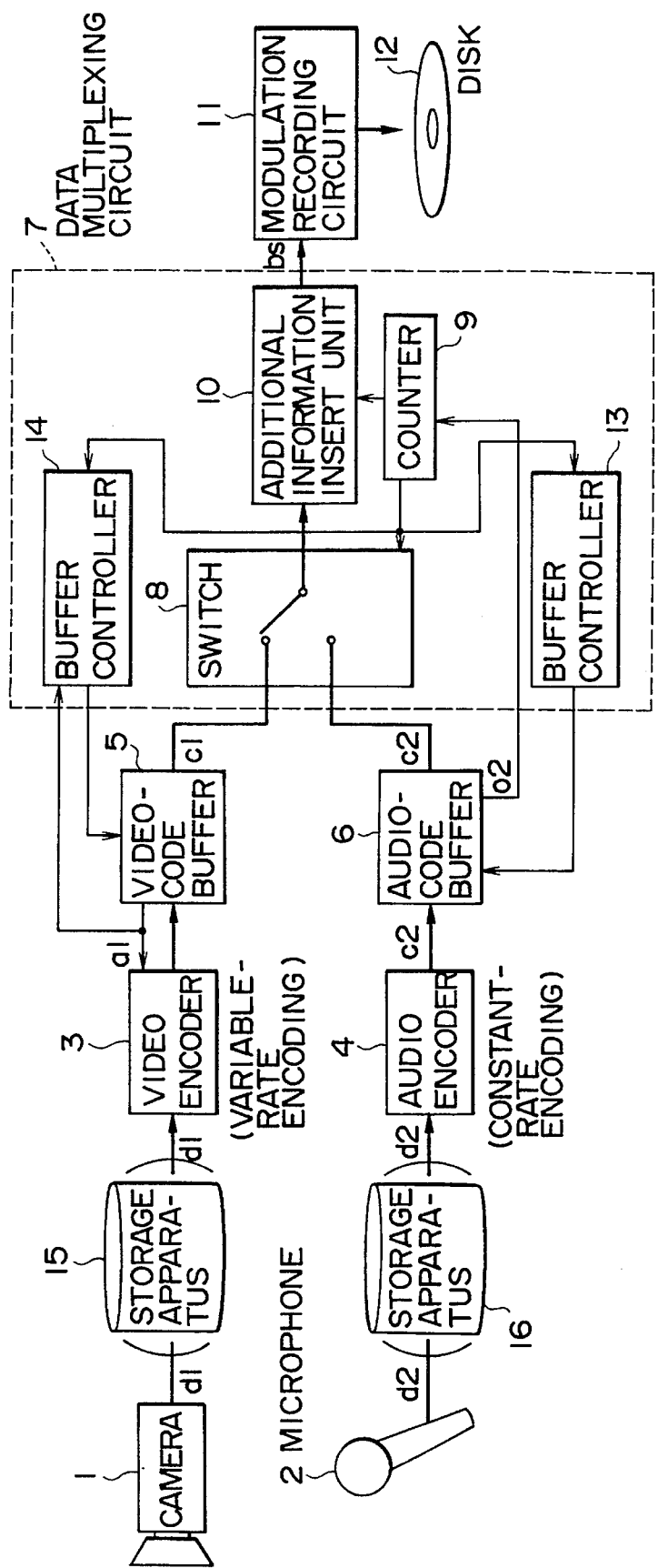
F I G. 1

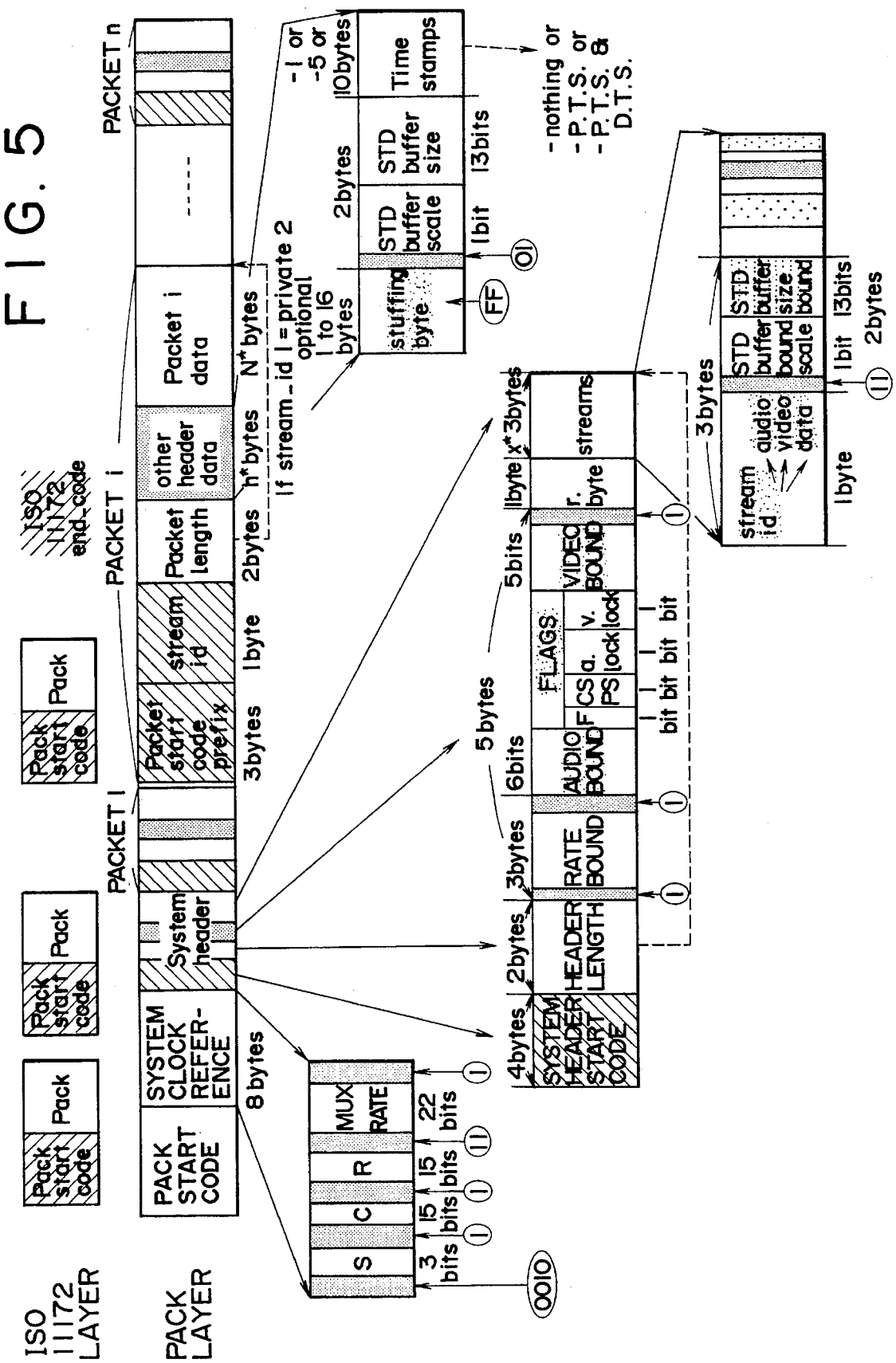

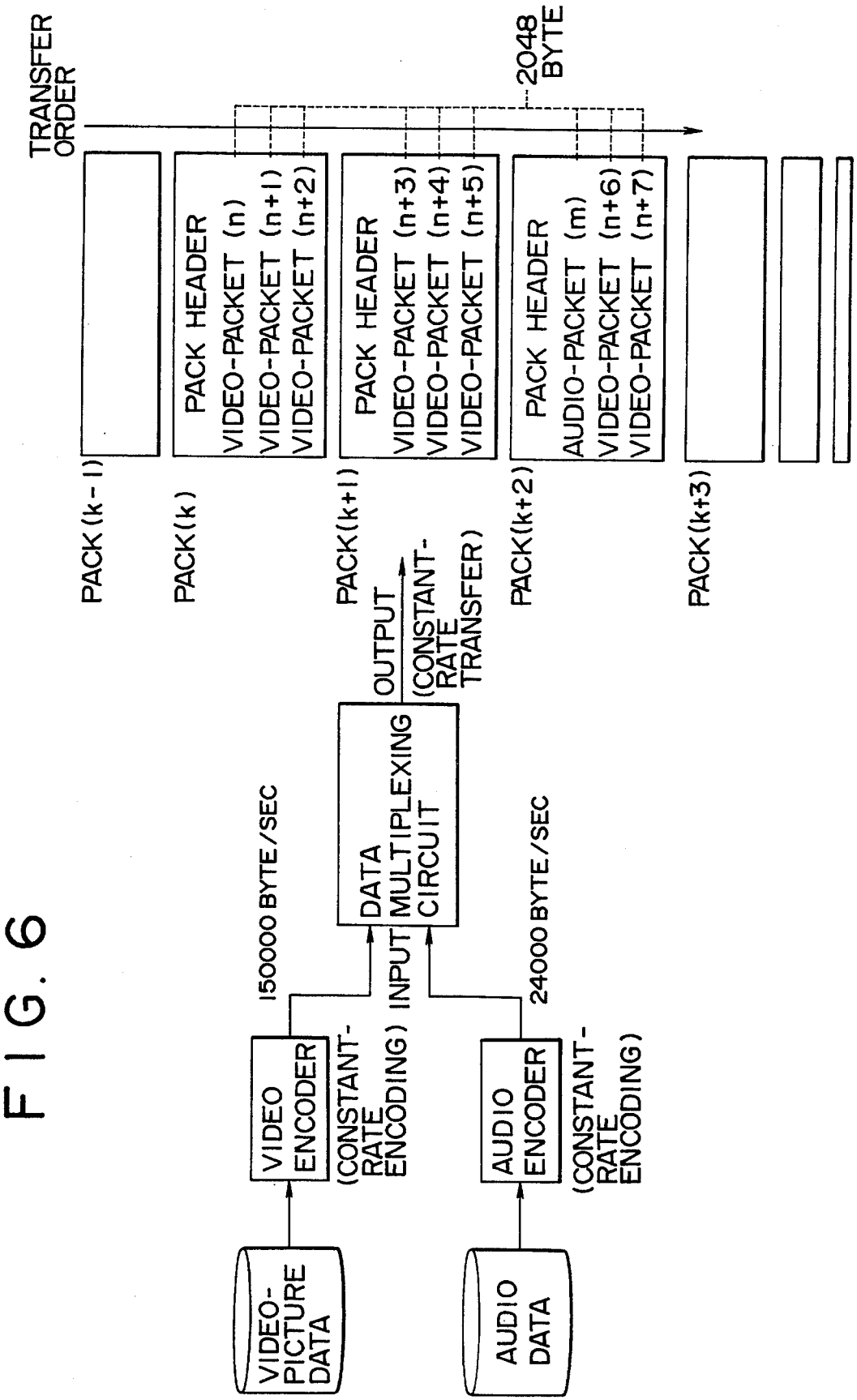

APPARATUS AND METHOD FOR MULTIPLEXING ENCODED DATA SIGNALS AND RECORDING MEDIUM HAVING MULTIPLEXED SIGNALS RECORDED THEREON

BACKGROUND OF THE INVENTION

1. Field of the Invention

This invention relates to a recording apparatus in which two or more different types of data, such as video and audio data, are multiplexed for recording on a recording medium, and more particularly relates to such a recording apparatus in which at least one of the types of data is encoded at a variable bit rate.

2. Description of Related Art

It has frequently been proposed to digitize video and audio signals and to record the digitized data on a recording medium such as an optical disk. Because of the very large quantity of data produced by digitizing such signals, it has also been proposed to perform compression coding on such data before recording. In this case, upon reproduction of the data from the recording medium, a decoding process is performed in order to reconstitute the digitized data. Where the reproduced data includes both video and audio data, such as constitute a television signal, the playing back of the video data must be synchronized with playback of the audio data. For this reason, it is customary to use a single apparatus for encoding and multiplexing the signal to be recorded. However, the multiplexing process does not necessarily have to be performed at the same time as the encoding process. During multiplexing, the different types of encoded data, such as the video and audio data, are read in at appropriate time intervals and at a proper rate. Then, after additional data, such as time stamps required for synchronous playback, is added to the video and audio data, a single data bit stream is produced.

In general, such data bit streams have a hierarchical structure. For example, the structure of a bit stream proposed by the Moving Picture Experts Group (MPEG) in International Standards Organization (ISO) Document No. 11172 is illustrated in FIG. 5. As shown in FIG. 5, the bit stream defined in ISO 11172 is made up of a sequence of packs, each of which includes a number of packets. Each pack starts with information such as a pack start code, a System Clock Reference (SCR) code and a system header. The SCR code is used for providing synchronization for the entire data storage and reproduction system including the encoder and decoder and is also used for controlling a buffer that will be described below.

Each packet begins with information such as a stream identification number, time stamps, and a required buffer size. The time stamps include a Presentation Time Stamp (PTS) and a Decoding Time Stamp (DTS). The PTS is indicative of a time at which the data was encoded by the encoder, whereas the DTS is indicative of a time at which the data was decoded by a decoder. The PTS and DTS are used to provide synchronous reproduction of different types of data. Compressed data such as video or audio data is inserted in the packet after the information which is located at the beginning of the packet. A packet which includes video data is called a video packet, and a packet which includes audio data is called an audio packet. Different types of data, such as video and audio data, are never mixed in a single packet.

According to the MPEG proposed standard described above, both the packs and the packets may be of variable length. The MPEG standard also proposes a bit-stream syntax which can accommodate simultaneously up to 32 substreams of audio data and up to 16 substreams of video data.

Details of the multiplexing process proposed by MPEG are described in 1-Annex A (Informative) associated with ISO 11172, and entitled "Description of the System Coding Layer", published on Mar. 27, 1992. The multiplexing processing standard proposed by MPEG includes some flexibility, as is shown by the fact that the packs and packets described therein can be of variable length. Accordingly, a variety of techniques can be employed for multiplexing in accordance with the MPEG standard. However, the most restrictive limitation placed on the multiplexing process by the MPEG standard is that the decoder buffer cannot be permitted to either overflow or underflow. For this purpose, the encoding and multiplexing apparatus includes a buffer which has the same capacity as the decoder buffer. The multiplexing process carried out in the encoding and multiplexing apparatus is controlled so that there is neither overflow nor underflow of the buffer provided therein. In the following description, "buffer" should be understood to mean the buffer memory provided in the encoding and multiplexing apparatus unless otherwise specified.

Other issues to be addressed in the multiplexing process include those relating to pack and packet lengths, pack configurations, and the ratio of different types of data packets to be inserted in each pack. It will be understood that "pack configuration" refers to the number of packets which make up each pack. It will also be recognized that the different types of data packets may include video packets and audio packets.

If input data such as video and audio data are all encoded at respective constant bit rates, the issues referred to above can be readily addressed. One way in which such issues can be resolved is illustrated by the example which is provided immediately below.

According to this example, video data is encoded at a constant rate of 150,000 bytes per second and the audio data is encoded at a constant rate of 24,000 bytes per second. Further, a constant packet length of 2,048 bytes is established for both video and audio packets. Since the video data rate is 6.25 (=150,000/24,000) times the audio data rate, and since the same packet length is provided for both video and audio packets, an insertion ratio of video packets to audio packets of 6.25 will permit the video and audio data to be reproduced synchronously. In other words, an audio packet must be inserted after every six or seven video packets.

Let it further be assumed that each pack is made up of three packets. In this case, a bit stream having the configuration shown in FIG. 6 is produced. It will be noted that, since the different types of data are all encoded at respective constant rates, an insertion ratio and a sequence for inserting the packets into the packs can be determined in advance on the basis of the data rates, the pack and packet lengths, and the pack configuration. Thus the multiplexing of the different types of data can be performed with relative ease. Furthermore, buffer control can be performed by monitoring the amount of data which has accumulated in the buffer. For example, if the buffer used for temporarily storing encoded video data is about to overflow, the quantization step used in quantization-encoding the video data can be increased, in a manner described below, to prevent the video data buffer from overflowing. In this way, buffer overflow is avoided because the amount of encoded data that is generated is temporarily reduced. On the other hand, if the video data buffer is about to underflow, pseudo data which is unrelated to the video and audio data can be inserted in order to temporarily increase the quantity of encoded data that is generated. In this way, buffer underflow can also be avoided.

It can be seen that a multiplexed bit stream can be generated with relative ease with respect to video and audio data generated at respective constant rates by means of multiplexing apparatus that operates at a predetermined ratio for inserting video and audio packets in a sequence of packs. Furthermore, when the video and audio data to be encoded happen to be such that highly efficient compression can be achieved, buffer underflow can be prevented by inserting pseudo data during the multiplexing process to assure that a constant bit rate is maintained. However, the insertion of pseudo data adversely effects the efficiency with which the recording capacity of a recording medium is used.

Furthermore, buffer overflow is prevented, again in order to maintain a constant data rate, by changing the value of a quantization step used in the encoding process. In particular, the quantization step is increased for portions of a picture which cannot be encoded with great efficiency or in portions having a relatively complex pattern for which compression cannot easily be performed. On the other hand, the quantization step is decreased for portions of a picture in which efficient encoding can be performed or in portions having a relatively even pattern for which compression is easily performed. As a result, uniform picture quality for the entire image cannot be assured. However, to achieve uniform picture quality, it can be contemplated to encode video data at a variable rate. Specifically, for portions of an image that cannot be efficiently encoded, the encoding rate can be temporarily increased to provide more code bits for the encoding process. On the other hand, for portions of an image in which highly efficient encoding can be performed, the encoding rate can be temporarily decreased. Thus, by adaptively controlling the encoding rate as described above, uniform picture quality across an entire video image can be obtained. Because the data encoding rate provided in this case is variable, it is not necessary to insert pseudo data, so that the recording capacity of the recording medium can be used efficiently.

Reference is made to the disclosure of multiplexing and demultiplexing apparatus used for processing variable-rate-encoded data in U.K. Patent Application GB 2 259 229, published on Mar. 3, 1993. However, a detailed description of techniques for controlling a code buffer employed in such multiplexing apparatus is not available.

Incidentally, in the variable-rate-encoding process described above, the encoding bit rate varies adaptively, and so cannot be predicted. Therefore, the ratio at which different types of packets, such as video and audio packets, are to be inserted in packs during the multiplexing process cannot be determined in advance. Further, it is more difficult to carry out multiplexing with respect to variable-rate-encoded data than is the case with respect to constant-rate-encoded data.

OBJECTS AND SUMMARY OF THE INVENTION

Accordingly, it is an object of the present invention to provide a multiplexing apparatus and method in which a plurality of types of data are efficiently multiplexed, with at least one of the types of data being variable-rate-encoded.

According to an aspect of the present invention, there is provided an apparatus for multiplexing encoded data signals which includes first encoding means for encoding a first input signal at a variable bit rate to form a first encoded data signal, second encoding means for encoding a second input signal to form a second encoded data signal, first storage means for temporarily storing the first encoded data signal formed by the first encoding means, second storage means for temporarily storing the second encoded data signal formed by the second encoding means, and means, selectively connected to the first and second storage means, for multiplexing the first and second encoded data signals respectively stored in the first and second storage means to form a multiplexed data stream signal. The apparatus further includes means for controlling transfer of the first encoded data signal from the first storage means to the means for multiplexing on the basis of a quantity of the first encoded data signal that is present in the first storage means.

According to another aspect of the invention, the means for controlling temporarily halts transfer of the first encoded data signal to the means for multiplexing when the quantity of the first encoded data signal present in the first storage means is zero, and the means for controlling transfers the first encoded data signal to the means for multiplexing at a predetermined transfer rate when the quantity of the first encoded data signal present in the first storage means is greater than zero.

According to a further aspect of the invention, the predetermined transfer rate is greater than the sum of a maximum encoding rate of the first encoding means and a maximum encoding rate of the second encoding means. According to yet another aspect of the invention, the apparatus further includes means for switching at fixed time intervals between a first switch position at which the means for multiplexing is connected to the first storage means and a second switch position at which the means for multiplexing is connected to the second storage means.

According to still another aspect of the invention, the second encoding means encodes the second input signal at a constant bit rate and the means for switching is switched between the first and second switch positions on the basis of a quantity of the second encoded data signal that is present in the second storage means. According to yet a further aspect of the invention, the apparatus includes means for recording the multiplexed data stream signal formed by the means for multiplexing on a recording medium such as an optical disk.

With a multiplexing apparatus according to the present invention, buffer underflow with respect to the video data is prevented by limiting transfer of data from the video data buffer to the multiplexing circuit. Thus, the apparatus prevents buffer underflow without generating pseudo data even when the video data represents pictures that have even patterns so that the data is highly compressible and the amount of encoded video data is small.

Furthermore, the apparatus according to the invention reads out data from each code buffer at a transfer rate that is greater than the sum of the maximum encoding rates for all of the data encoders. Thus, even when the video data represents pictures having complex patterns, so that the video data cannot be highly compressed, buffer overflow is prevented with respect to the video data because of the high data transfer rate. Moreover, in the apparatus according to the present invention, the source of encoded data to the multiplexing means is switched at fixed time intervals in order to provide multiplexing of these various types of data without resorting to a predetermined packet insertion ratio, or the like.

The above, and other objects, features and advantages of the present invention will become apparent from the following detailed description of illustrative embodiments thereof which is to be read in conjunction with the accompanying drawings, in which like reference numerals are used to identify the same or similar parts in the several views.

BRIEF DESCRIPTION OF THE DRAWINGS

FIG. 1 is a block diagram of a first embodiment of a data encoding and multiplexing apparatus in accordance with the present invention;

FIG. 5 is a diagram which illustrates the structure of a multiplexed bit stream in accordance with a standard proposed by the Moving Picture Experts Group (MPEG); and FIG. 6 is a diagram which illustrates a packet insertion sequence used in multiplexing video and audio data which are encoded at respective constant rates.

DETAILED DESCRIPTION OF THE PREFERRED EMBODIMENTS

Figure 2:
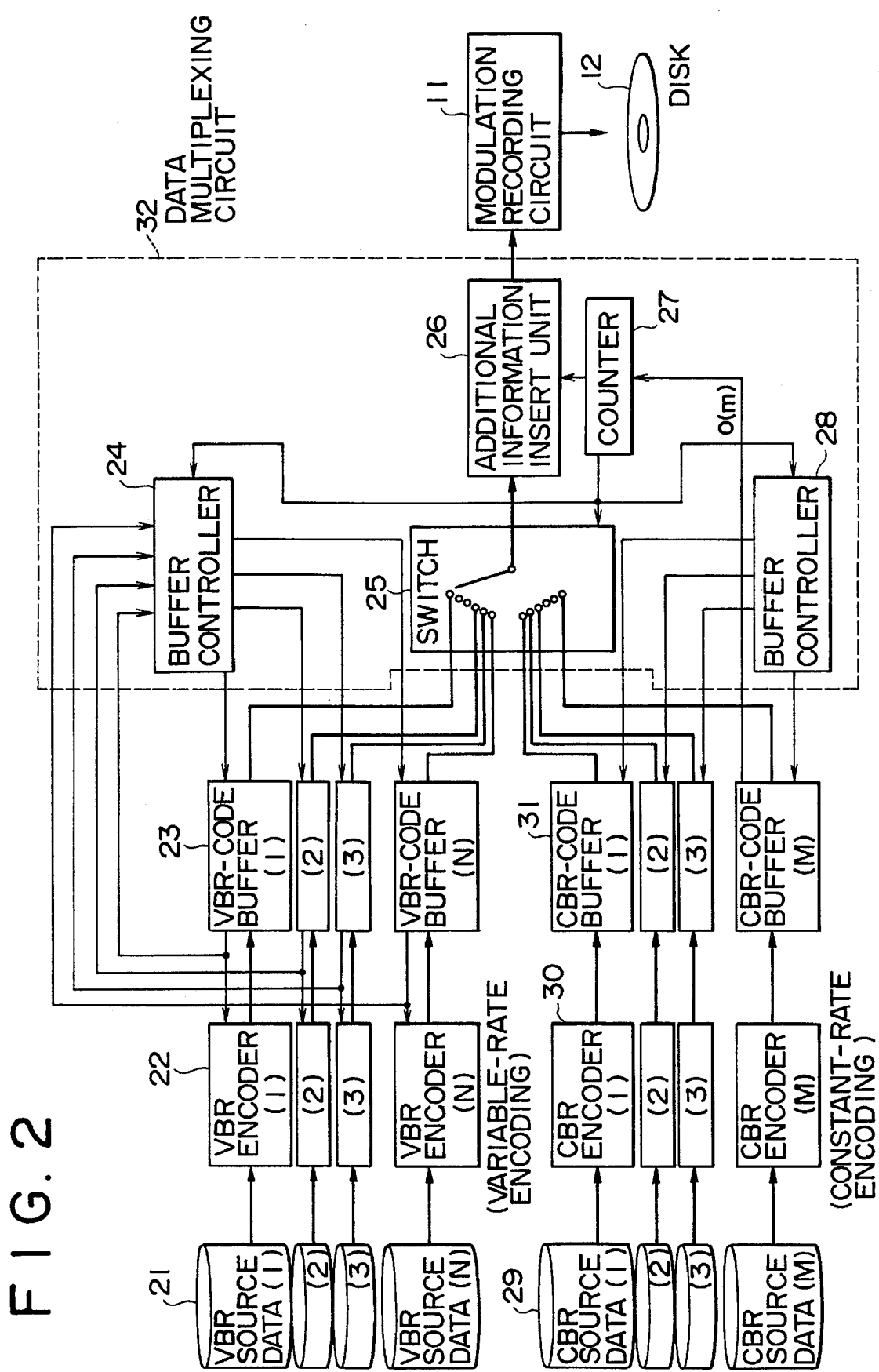
FIG. 2 is a block diagram of a more generalized embodiment of a data encoding and multiplexing apparatus in accordance with the present invention.

Referring initially to FIG. 1, there will now be described an embodiment of the present invention in which variable-rate-encoded video data is multiplexed with constant-rate-encoded audio data. In this embodiment, the video data is compression-encoded at a variable rate that does not exceed a maximum encoding rate Rvmax which approaches 10 Mbps. Further, the audio data is encoded at a fixed encoding rate Ra of 1.5 Mbps, and the encoded video and audio data are multiplexed together. Buffers of fixed size, such as 2,048 bytes, are respectively provided for the encoded video and audio data and the lengths of the video and audio packets are variable. Header data and other information is added to the multiplexed bit stream at a rate that does not exceed a maximum rate Rsmax of 4.5 Mbps so that the transfer rate for the entire data stream is less than 17 Mbps.

As shown in FIG. 1, video data d1 is generated at a camera 1 and supplied to a video encoder 3 for compression-encoding. The video data d1 provided by the camera 1 can optionally be temporarily stored in a storage apparatus 15 before the video data is supplied to the video encoder 3. In the video encoder 3, processing such as Discrete Cosine Transformation (DCT), quantization and Variable Length Coding (VLC) is performed to produce encoded video data at a variable bit rate. The resulting encoded video data c1 is supplied from the video coder 3 to a video code buffer 5 for temporary storage therein. Since the video encoder 3 encodes the video data d1 at a variable bit rate, the amount o1 of encoded video data which is present in the video code buffer 5 varies over time. The amount o1 of encoded video data present in the video code buffer 5 will sometimes be referred to hereinafter as the video data accumulation quantity.

A signal representative of the video data accumulation quantity o1 is supplied from the video code buffer 5 to the video encoder 3. The video encoder 3 allocates a quantity of bits to be used in the video data compression-encoding process for the next picture on the basis of the video data accumulation quantity o1. More concretely, in a quantization device (not separately shown) that is part of the video encoder 3, parameters such as a quantization step are varied on the basis of the video data accumulation quantity o1 to control the encoding bit rate so that the video code buffer 5 does not overflow. A signal representing the video data accumulation quantity o1 is also provided to a buffer controller 14 which will be discussed below.

Turning now to an audio channel of the apparatus of FIG. 1, audio information d2 generated at a microphone 2 is provided to an audio encoder 4 for encoding at a fixed bit rate. For example, the audio encoder 4 may employ 16-bit linear quantization according to a process known as linear PCM. As in the video channel discussed above, the audio information d2 generated by the microphone 2 may optionally be temporarily stored in a storage apparatus 16 before being supplied to the audio encoder 4. Encoded audio data c2, resulting from the encoding performed at the audio encoder 4, is supplied to an audio code buffer 6 for temporary storage therein.

Because the encoded audio data c2 is generated at a constant bit rate by the audio encoder 4, a quantity o2 of the encoded audio data c2 present in the audio code buffer 6 can be maintained at a fixed value that does not change over time, by transferring the encoded audio data c2 from the audio code buffer 6 at the same rate. In practice, however, the audio code buffer 6 is operated so that it is alternately and repeatedly placed in a transfer state and a wait state. During the transfer state, encoded audio data c2 is transferred out of the audio code buffer 6 at a constant transfer rate that is greater than the sum of the constant bit rate Ra of the audio encoder 4 and the maximum bit rate Rvmax of the video encoder 3, whereas in the wait state no encoded audio data c2 is transferred from the audio code buffer 6. Consequently, the audio data accumulation quantity o2 (i.e. the quantity of encoded audio data c2 present in the audio code buffer 6) varies over time according to a fixed pattern.

A data multiplexing circuit 7 receives, in an alternating fashion, encoded video data c1 transferred from video code buffer 5 and encoded audio data c2 transferred from the audio code buffer 6. The data multiplexing circuit 7 multiplexes the encoded video data c1 with the encoded audio data c2. A switch 8 that is part of the data multiplexing circuit 7 switches between a first position at which the data multiplexing circuit 7 is connected to receive encoded video data transferred from the video code buffer 5 and a second position at which the data multiplexing circuit 7 is connected to receive the encoded audio data transferred from the audio code buffer 6. The switching position of the switch 8 is controlled by a counter 9 that is also part of the data multiplexing circuit 7. In particular, the counter 9 monitors the audio data accumulation quantity o2 representing the amount of encoded audio data present in the audio code buffer 6, and based on the audio data accumulation quantity o2, the counter 9 causes the switching state of switch 8 to be changed at fixed time intervals. In other words, the operation of switch 8 is based on the quantity of audio data accumulated in the audio code buffer at a constant bit rate. Thus the multiplexing of the video and audio data is carried out using the constant-rate-encoded audio data as a time reference.

A buffer controller 13 controls transfer of the encoded audio data from the code buffer 6 on the basis of a signal provided to the buffer controller 13 from the counter 9. That is, transfer of the encoded audio data from the audio code buffer 6 is synchronized with switching of the switch 8. During the fixed period of time in which the switch 8 is at its second position for connecting the data multiplexing circuit 7 to the audio code buffer 6, a fixed amount of encoded audio data c2 is transferred from the audio code buffer 6 to the data multiplexing circuit 7. At other times, i.e. when the switch 8 is in its first position for connecting the data multiplexing circuit 7 to the video code buffer 5, encoded audio data c2 is not transferred from the audio code buffer 6. Rather, during such times, a buffer controller 14 controls transfer of encoded video data c1 from the video code buffer 5 on the basis of a signal provided to the buffer controller 14 from the counter 9. At times when the switch 8 is in its first position, and there is encoded video data c1 present in video code buffer 5, the encoded video data c1 is transferred from the video code buffer 5 to the data multiplexing circuit 7 at an appropriate transfer rate of 11.5 Mbps. However, at times when the switch 8 is in its first position and there is no encoded video data c1 present in the video code buffer 5, the buffer controller 14 temporarily halts the transferring of the encoded video data c1 to the data multiplexing circuit 7, placing the video code buffer 5 in a wait state until encoded video data c1 again has accumulated in the video code buffer 5. In this way, the video code buffer 5 can be prevented from underflowing, and at a later time when the encoded video data c1 has again accumulated in the video code buffer 4, the buffer controller 14 causes transfer of the encoded video data c1 from the video code buffer 5 to the data multiplexing circuit 7 to resume.

An additional information insert unit 10 that is part of the data multiplexing circuit 7 receives the encoded video and audio data that is alternately supplied to the data multiplexing circuit 7 and adds thereto information such as a time code in order to form audio and video packets making up a bit stream bs. The information generated at the additional information unit 10 may be based, for example, on data provided from the counter 9.

The resulting bit stream bs, including the multiplexed video and audio packets and the additional information generated at the additional information insert unit 10, is supplied to a modulation recording circuit 11 for recording on a disk 12 (such as an optical disk) which has been inserted in a disk drive (not shown).

The transfer of the data from the video code buffer 5 and the audio code buffer 6 to the data multiplexing apparatus 7 is controlled to provide an overall data transfer rate that is greater than the sum Rvmax+Ra, where Rvmax is the maximum encoding rate of the video encoder 3, and Ra is the fixed encoding rate of the audio encoder 4. It will be recognized that the transfer rate of the encoded video data c1 also is dependent on the size of the packs which are to be formed.

Also, as noted before, the video code buffer 5 is switched between a wait state and a transfer state under control of the buffer controller 14 and on the basis of the video data accumulation quantity o1 representing the amount of encoded video data present in the video code buffer 5.

Figure 3:
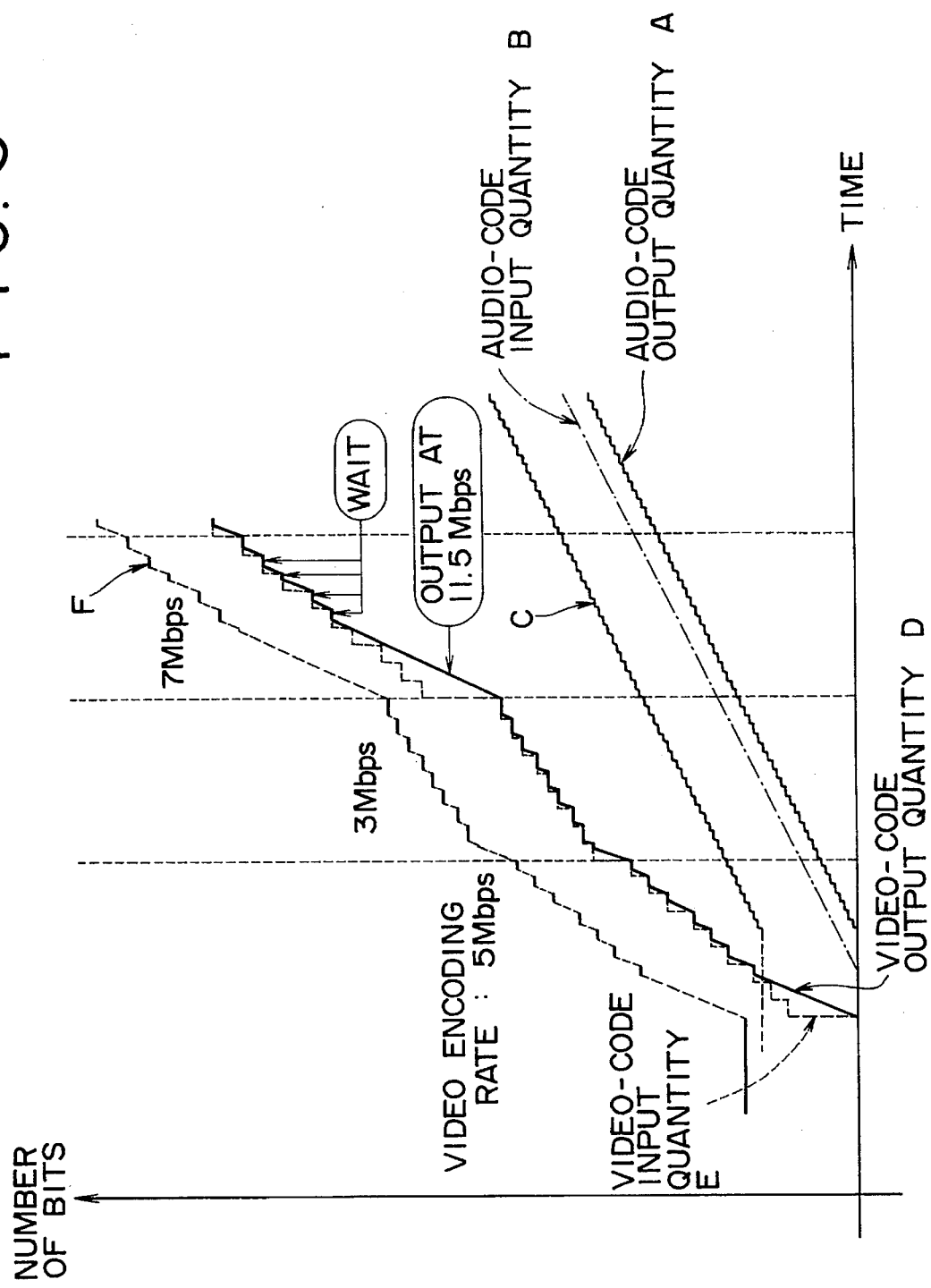
FIG. 3 is a diagram which illustrates how encoded data accumulates in code buffers provided in the apparatus of FIG. 1.

FIG. 3 illustrates changes over time of accumulated quantities of data provided from the video and audio code buffers 5 and 6. The horizontal axis of FIG. 3 represents the passing of time, whereas the vertical axis represents the accumulated number of bits. In FIG. 3, curve A represents a quantity of bits of encoded audio data supplied by the audio code buffer 6 to the data multiplexing circuit 7. Curve B represents the accumulated quantity of bits supplied to the audio code buffer 6 from the audio encoder 4. The gap between curve A and curve C shows the capacity of audio code buffer 6, whereas the gap between curves A and B represents the quantity of encoded audio data present in the audio code buffer 6.

A curve D in FIG. 3 represents an accumulated quantity of bits of encoded video data supplied from the video code buffer 5 to the data multiplexing circuit 7. A curve E represents the accumulated quantity of bits of encoded video data supplied to the video code buffer 5 from the video encoder 3. The gap between curves D and E represents the quantity of encoded video data present in the video code buffer 5. The gap between curves D and F represents the capacity of the video code buffer 5.

Figure 4:
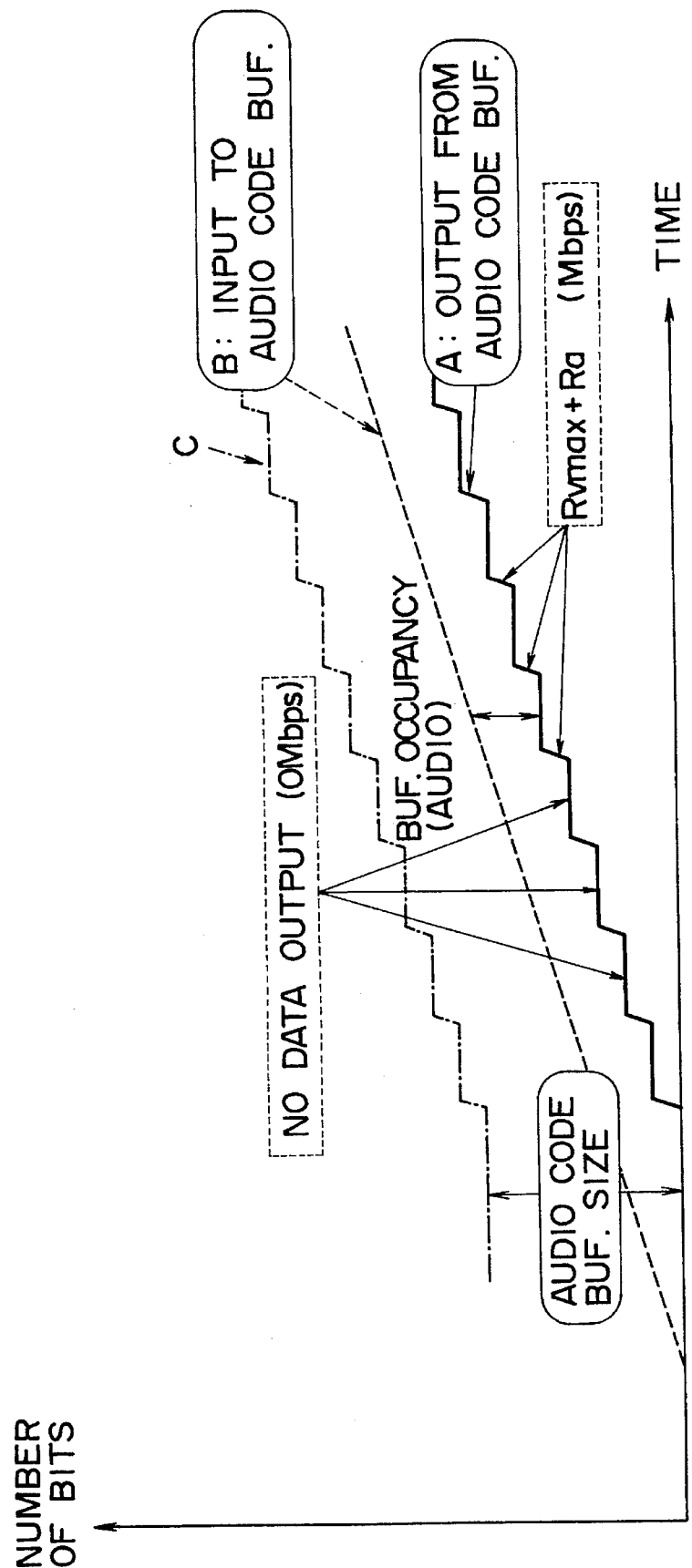
FIG. 4 is a diagram which illustrates additional details concerning accumulation of encoded audio data in an audio code buffer provided in the apparatus of FIG. 1.

Encoded video data is supplied to the video code buffer 5 at a variable rate. However, the rate at which data is output from the video code buffer 5 depends, among other factors, on the quantity of data present in the video code buffer 5, the size of the pack being created, and the length of the time intervals during which audio data is transferred to the data multiplexing circuit 7. As a result, the amount of data present in the video code buffer 1 is subject to random variations over time. On the other hand, the encoded audio data supplied to the audio code buffer 6 is provided at a constant bit rate as shown in detail in FIG. 4. In particular, as shown in FIG. 4, the audio code buffer 6 is alternately subjected to transfer states represented by slanting segments of the curve A and wait states represented by horizontal segments of the curve A. It will be noted that the transfer and wait states take place repeatedly at fixed time intervals. During a transfer state, the encoded audio data c2 is supplied from the audio code buffer 6 to the data multiplexing circuit 7 at a transfer rate of 11.5 Mbps which is greater than the sum Rvmax+Ra. However, during the wait states, no audio data is transferred from the audio code buffer 6 to the data multiplexing circuit 7. As a result, the audio data accumulation quantity o2 is varied according to a repeating pattern at fixed time intervals. Nevertheless, over time the average amount of data present in the audio code buffer 6 does not change. It will also be recognized that data is stored in and transferred from the audio code buffer 6 in such a manner that neither overflow nor underflow occurs.

Incidentally, in the curve D shown in FIG. 3, which represents the accumulated quantity of data output from the video code buffer 5, the horizontal segments of the curve represent a wait state during which no encoded video data is transferred from the video code buffer 5 to the data multiplexing circuit 7. As noted before, the video code buffer 5 is placed in a wait state when the buffer controller 14 determines that there is no encoded video data present in the video code buffer 5. This determination is made by the buffer controller 14 by monitoring the video data accumulation quantity signal o1 which represents the quantity of encoded video data c1 present in the video code buffer 5. On the other hand, the slanting segments (i.e. non-horizontal segments) of the curve D are indicative of transfer states in which the encoded video data c1 is transferred from the video code buffer 5 to the multiplexing circuit 7. The rate of transfer during the transfer state is typically 11.5 Mbps, which, as noted before, is greater than the sum of Rvmax+Ra. However, it should be noted that the encoded video data c1 is actually transferred from the video code buffer 5 to the data multiplexing circuit 7 only during periods which coincide with horizontal segments of the curve A of FIG. 3. During such periods, no encoded audio data c2 is being transferred from the audio code buffer 6 to the data multiplexing circuit 7. Accordingly, the slanting segments of curve D actually should be understood to include short horizontal sub-segments which coincide with slanting segments of the curve A. Nevertheless, in order to simplify the drawing, each slanting segment of the curve D is represented by a straight line representing periods during which encoded video data c1 is transferred to the data multiplexing circuit 7. Similarly, it should be noted that the slanting segments of the curve F actually include brief horizontal sub-segments, but in order to simplify the drawing, the slanting segments of the curve F also are represented by a straight line.

In the embodiment described above, the data which is variable-rate-encoded is video data. However, it should be noted that the variable-rate-encoded data does not have to be video data. For example, the apparatus shown in this embodiment can also be applied such that other types of data, including audio data or captions, are variable-rate-encoded.

Moreover, in the embodiment described above, the audio data was encoded at a constant rate. However, as an alternative, the audio data can be encoded at a variable rate that does not exceed a maximum rate of Ramax. In this case, transfer of the data from the video code buffer 5 and the audio code buffer 6 to the data multiplexing circuit 7 is controlled to provide a transfer rate that is greater than the sum of Rvmax+Ramax, where Rvmax is the maximum encoding rate for the video information and Ramax is the maximum encoding rate for the audio information. It should also be noted that if the audio data is variable-rate-encoded, the quantity of audio data present in the audio code buffer 6 is subject to random variations. Accordingly, counter 9 does not use the audio data accumulation quantity o2 as a time reference. Instead a reference clock signal (not shown) is provided to the counter 9, which controls the position of switch 8 to provide switching at fixed time intervals on the basis of the reference clock signal.

In the embodiment of FIG. 1 as described above, only one variable-rate-encoded video data signal and only one constant-rate-encoded audio data signal are supplied to the data multiplexing apparatus. It should be noted, however, that the embodiment of FIG. 1 can be generalized for application to plural video and plural audio signals. FIG. 2 illustrates such a generalized embodiment of a data multiplexing apparatus, in which plural video signals are encoded at different variable rates and plural audio signals are encoded at different constant rates.

As shown in FIG. 2, the second embodiment of the present invention is a data multiplexing apparatus which is a generalized version of the apparatus of FIG. 1. It is to be noted that both embodiments have the same basic configuration. In the embodiment of FIG. 2, N streams of Variable Bit Rate (VBR) source data 21 are supplied to N respective VBR encoders 22, which perform encoding on the input data streams at respective different variable rates. The N streams of data, having been encoded at the different variable rates, are temporarily stored in a corresponding group of N respective VBR code buffers 23.

In addition, M streams of Constant Bit Rate (CBR) source data 29 are supplied to M respective CBR encoders 30 which perform encoding on the M streams of data at respective different constant rates. The resulting M streams of data, having been encoded at the different constant rates, are then temporarily stored in a corresponding group of M respective CBR code buffers 31. Finally, the N streams of data encoded at the different variable rates and the M streams of data encoded at the different constant rates are supplied to a data multiplexing circuit 32.

The data multiplexing circuit 32 of FIG. 2 performs multiplexing by receiving the streams of code data from the CBR code buffers 31 and the VBR code buffers 23 in an appropriate order. The streams of code data are selected one after another as inputs to the data multiplexing circuit 32 by a switch 25 operating under control of a counter 27. The counter 27 monitors a data accumulation quantity o(m) which is indicative of the quantity of constant-rate-encoded data present in one of the CBR code buffers 31. On the basis of the monitored data accumulation quantity o(m), the source of input to the data multiplexing circuit 32 is switched sequentially among the VBR code buffers 23 and the CBR code buffers 31 at fixed time intervals.

A buffer controller 28 that is part of the data multiplexing circuit 32 controls transfer of data from the CBR code buffers 31 in synchronism with the switching of the switch 25. Each of the CBR code buffers 31 is connected, in sequence, to the data multiplexing circuit 22 by the switch 25 for a fixed period of time. During the respective fixed period of time, a certain amount of CBR code is transferred to the data multiplexing circuit 32 from the respective CBR code buffer 31, by way of the switch 25 and under control of the buffer controller 28. The transfer rate is greater than the sum of the maximum encoding rates of all of the CBR and VBR encoders 30 and 22.

At times when none of the CBR code data streams are being transferred to the data multiplexing circuit 32, the switch 25 is positioned to selectively connect the VBR code buffers 23 to the data multiplexing circuit. At such times, a buffer controller 24 provided in the data multiplexing circuit 32 controls transfer of the VBR data from the VBR code buffers 23. During those times, the VBR code buffers 23 are sequentially connected, one after the other, to the data multiplexing circuit 32 by way of the switch 25. During each respective fixed period of time, a certain amount of VBR code data is transferred to the data multiplexing circuit 32 from the respective VBR code buffer 23 by way of the switch 25 and under control of the buffer controller 24. The transfer rate is greater than the sum of the maximum encoding rates of all of the CBR and VBR encoders 30 and 22.

Each of the VBR code buffers 23 from which VBR code is to be read out is assigned a priority. On the basis of the assigned priority, scheduling is implemented by the switch 25. However, if there is no VBR code present in the VBR code buffer which is presently scheduled for transfer, then the transferring of the VBR code data from that buffer 23 is temporarily halted, and the particular buffer 23 is placed in a wait state until the VBR code data has again accumulated therein. In this way, the VBR code buffers can be prevented from underflowing. Alternatively, if sufficient code data is present in another VBR code buffer 23, transfer of code data from such other VBR code buffer 23 can be implemented instead of simply halting the transfer from the empty code buffer. It will be appreciated that at a future time, when the previously empty VBR code buffer 23 again has VBR code data present therein, the buffer controller 24 causes the transferring operation from such VBR code buffer 23 to resume, resulting in transfer of the VBR code therefrom to the data multiplexing circuit 32 by way of the switch 25.

An additional information insert unit 26 provided in the data multiplexing circuit 32 receives the data from the respective VBR and CBR streams and appends information thereto to form packets which make up a bit stream output from the data multiplexing circuit 32. The appended information includes data such as time codes, and may, for example, be based upon data provided from the counter 27.

The bit stream output from the data multiplexing circuit 32 is supplied to a modulation recording circuit 11 for recording on a recording medium such as an optical disk 12.

In data multiplexing circuits in accordance with the above embodiments, code buffer underflow is prevented notwithstanding the variable rates at which data is provided to the code buffers by causing the code buffers to enter and leave transfer and wait states on the basis of the quantity of data present in the buffers.

In addition, because data is transferred from each code buffer to the data multiplexing circuit at a rate that is greater than the sum of the maximum encoding rates of all encoders in the system, buffer overflow can be prevented with respect to all of the code buffers.

Furthermore, because switching is performed at fixed time intervals among the code buffers which provide input data to the data multiplexing circuit, the resulting bit stream includes encoded data for predetermined periods of time corresponding to fixed time intervals. Accordingly, the decoding process results only in small delays, facilitating synchronization among the different types of encoded data.

Moreover, using constant-rate-encoded data as a time reference makes it possible to provide multiplexing at constant time intervals with a relatively simple circuit configuration. Also, buffer underflow is prevented without generating pseudo data, so that the storage capacity of the recording medium is used efficiently. Still further, for some types of recording apparatus, the period of time for which the recording medium can store data can be extended by taking advantage of the recording medium capacity that would otherwise be used for storing pseudo data.

Having described illustrative embodiments of the invention with reference to the accompanying drawings, it is to be understood that the invention is not limited thereto, and that various changes and modifications can be effected therein by one skilled in the art without departing from the scope or spirit of the invention as defined in the appended claims. For example, it should be recognized that the present invention is applicable to various types of optical disks, such as CD-ROM and magneto-optical disks, and is also applicable to other types of recording media such as magnetic tape. Moreover, the present invention can be applied to data transmission systems, including cable, and satellite or other wireless data transmission, in addition to data recording and reproduction systems.

What is claimed is:

1. An apparatus for multiplexing encoded data signals, the apparatus comprising:

first encoding means for encoding a first input signal at a variable bit rate to form a first encoded data signal;

second encoding means for encoding a second input signal to form a second encoded data signal;

first storage means for temporarily storing said first encoded data signal formed by said first encoding means;

second storage means for temporarily storing said second encoded data signal formed by said second encoding means;

means, selectively connected to said first and second storage means, for multiplexing said first and second encoded data signals respectively stored in said first and second storage means to form a multiplexed data stream signal; and means for controlling transfer of said first encoded data signal from said first storage means to said means for multiplexing on the basis of a quantity of said first encoded data signal that is present in said first storage means.

2. An apparatus for multiplexing encoded data signals according to claim 1; wherein said means for controlling temporarily halts transfer of said first encoded data signal to said means for multiplexing when said quantity of said first encoded data signal present in said first storage means is zero, and said means for controlling transfers said first encoded data signal to said means for multiplexing at a predetermined transfer rate when said quantity of said first encoded data signal present in said first storage means is greater than zero.

3. An apparatus for multiplexing encoded data signals according to claim 2; wherein said predetermined transfer rate is greater than the sum of a maximum encoding rate of said first encoding means and a maximum encoding rate of said second encoding means.

4. An apparatus for multiplexing encoded data signals according to claim 1; further comprising means for switching at fixed time intervals between a first switch position at which said means for multiplexing is connected to said first storage means and a second switch position at which said means for multiplexing is connected to said second storage means.

5. An apparatus for multiplexing encoded data signals according to claim 4; wherein said second encoding means encodes said second input signal at a constant bit rate and said means for switching is switched between said first and second switch positions on the basis of a quantity of said second encoded data signal that is present in said second storage means.

6. An apparatus for multiplexing encoded data signals according to claim 1; wherein said second encoding means encodes said second input signal at a constant bit rate.

7. An apparatus for multiplexing encoded data signals according to claim 1; further comprising means for recording on a recording medium said multiplexed data stream signal formed by said means for multiplexing.

8. An apparatus for multiplexing encoded data signals according to claim 7; wherein said recording medium is an optical disk.

9. A method of multiplexing encoded data signals, the method comprising the steps of:

encoding a first input signal at a variable bit rate to form a first encoded data signal;

encoding a second input signal to form a second encoded data signal;

temporarily storing said first encoded data signal in a first storage means;

temporarily storing said second encoded data signal in a second storage means;

multiplexing said first and second encoded data signals respectively stored in said first and second storage means by using a multiplexing means to form a multiplexed data stream signal; and controlling transfer of said first encoded data signal from said first storage means to said multiplexing means on the basis of a quantity of said first encoded data signal that is present in said first storage means.

10. A method of multiplexing encoded data signals according to claim 9; wherein said controlling step includes halting transfer of said first encoded data signal to said multiplexing means when said quantity of said first encoded data signal present in said first storage means is zero and transferring said first encoded data signal to said multiplexing means at a predetermined transfer rate when said quantity of said first encoded data signal present in said first storage means is greater than zero.

11. A method of multiplexing encoded data signals according to claim 10; wherein said predetermined transfer rate is greater than the sum of a maximum rate at which said first input signal is encoded and a maximum rate at which said second input signal is encoded.

12. A method of multiplexing encoded data signals according to claim 9; further comprising the step of switching a switch device at fixed time intervals between a first switch position at which said multiplexing means is connected to said first storage means and a second switch position at which said multiplexing means is connected to said second storage means.

13. A method of multiplexing encoded data signals according to claim 12; wherein said second input signal is encoded at a constant bit rate and said switching step is performed on the basis of a quantity of said second encoded data signal that is present in said second storage means.

14. A method of multiplexing encoded data signals according to claim 9; wherein said second input signal is encoded at a constant bit rate.

15. A method of multiplexing encoded data signals according to claim 9; further comprising the step of recording said multiplexed data stream signal on a recording medium.

16. A method of multiplexing encoded data signals according to claim 15; wherein said recording medium is an optical disk.

17. A data recording medium on which is recorded a multiplexed data stream signal formed according to a method which comprises the following steps:

encoding a first input signal at a variable bit rate to form a first encoded data signal;

encoding a second input signal to form a second encoded data signal;

temporarily storing said first encoded data signal in a first storage means;

temporarily storing said second encoded data signal in a second storage means;

multiplexing said first and second encoded data signals respectively stored in said first and second storage means by using multiplexing means to form said multiplexed data stream signal; and controlling transfer of said first encoded data signal from said first storage means to said multiplexing means on the basis of a quantity of said first encoded data signal that is present is said first storage means.

18. A data recording medium according to claim 17; wherein said controlling step included halting transfer of said first encoded data signal to said multiplexing means when said quantity of said first encoded data signal present in said first storage means was zero.

19. A data recording medium according to claim 17; wherein said second input signal was encoded at a constant bit rate.

20. A data recording medium according to claim 17; wherein said data recording medium is an optical disk.

* * * * *